Patented Apr. 13, 1937

2,076,545

UNITED STATES PATENT OFFICE 2,076,545

METHOD OF PREPARING A DECOLORIZING MATERIAL

Lyle Caldwell, Los Angeles, Calif.

No Drawing. Application May 10, 1935, Serial No. 20,756

8 Claims. (Cl. 252—2)

This invention relates to the preparation of a decolorizing material and pertains particularly to a method of producing, by synthesis, a decolorizing or bleaching material of advantageous physical properties at a low cost.

This application is a continuation-in-part of my co-pending application for "Method of preparing a decolorizing material", filed April 26, 1935, Serial No. 18,343.

One of the particular objects of the present invention is to provide a process for preparing a synthetic material having advantageous decolorizing properties, both with respect to oleaginous and aqueous materials, a high filtration rate as compared with most known inorganic bleaching materials, and a remarkably low "cake-retention", that is, the retention of the filtrate in the filter-cake.

A further object of the invention is to provide a method for the production of a synthetic bleaching material at a low cost as compared with hitherto proposed methods. The principal feature of the invention with respect to such lower costs is in the employment of relatively cheap and readily available raw materials.

The material produced according to the process of the present invention comprises, essentially, a hydrated magnesium silicate, which material may be associated, under certain conditions of manufacture, with other silicate compounds, such as calcium and aluminum silicates, or with other materials which may or may not have decolorizing properties, such as calcium sulphate. The association of these other compounds may be either wholly physical, partly physical and partly chemical, or wholly chemical. The presence of such compounds other than the desired magnesium silicate may be due wholly to the presence of foreign compounds in the starting materials, or may be due to the particular type of reacting materials employed, in which case such other compounds may be a by-product of the reaction which produces the desired magnesium silicate.

The process of the present invention comprises, essentially, the hydrothermal reaction of a soluble magnesium salt with a calcium compound and silica, in which reaction the silica becomes associated with the magnesium of the soluble magnesium salt and the calcium becomes associated with the anion of such salt. In case the calcium compound contains an appreciable proportion of magnesia, either chemically or physically associated therewith, I prefer to employ sufficient silica to also combine with such magnesia. The calcium compound may comprise calcium carbonate or a calcium-magnesium carbonate, such as a dolomitic limestone or dolomite; calcium oxide or a calcium-magnesium oxide, such as calcined dolomite; or calcium hydroxide, such as hydrated lime, or a calcium-magnesium hydroxide, such as hydrated calcined dolomite. In case an oxide is used as the calcium compound for the reaction, it is probably hydrated due to the presence of water, and therefore reacts as a hydroxide.

The soluble salt of magnesium may comprise any soluble salt of magnesium and an acid stronger than silicic acid, such as magnesium bromide, magnesium chloride, magnesium chromate, magnesium nitrate, or magnesium sulphate; of the above salts, only magnesium chloride and magnesium sulphate are at present commercially feasible, in view of the low cost thereof in comparison with the cost of other soluble magnesium salts. Magnesium chloride and magnesium sulphate or mixtures thereof react quite advantageously in the reaction of the present invention, the magnesium becoming associated with the silica and the chloride or sulphate radicals becoming associated with the calcium of the calcium compound. The calcium salt formed may be either soluble as in the case of calcium chloride, or relatively insoluble as in the case of calcium sulphate. Where calcium chloride is a reaction product, it may be readily removed from the magnesium silicate by water-washing, but it has not been found feasible to separate the comparably produced calcium sulphate. At the same time, it has been determined that calcium sulphate present with the magnesium silicate as an associated material does not detract from the bleaching capabilities of the magnesium composition other than by acting as a diluent, though the decrease in decolorizing efficiency of the material does not directly follow the proportion of calcium sulphate present. For example, a material produced as above set forth and containing approximately 30% of gypsum ($CaSO_4.2H_2O$), was found to have a bleaching efficiency substantially equivalent to another material containing no gypsum but made under substantially equivalent conditions with magnesium chloride alone.

The expression "hydrothermal reaction" as used herein is understood to mean a reaction in the presence of water at superatmospheric temperature. Such reaction may be carried out by simply boiling the aqueous mixture of solid material, preferably in finely divided condition, at atmospheric pressure, or may be carried out at a faster rate by heating the mixture to a higher temperature under superatmospheric pressure, as in an autoclave. It is further preferable to provide agitation during the hydrothermal reaction. The proportion of water used in the reaction is preferably such as to provide not only sufficient water for chemical combination, but to also maintain the reaction mixture in a satisfactory fluid condition.

The time required for the reaction varies considerably, dependent upon the nature and proportions of materials employed, the fineness of division of such materials, the temperature, degree of agitation and other conditions. In general, I have found that a relatively short period, such as one to three hours, is sufficient at a temperature of 400° to 450° F. under pressure and continuous agitation, while a somewhat longer period, such as ten hours or longer, is required at the temperature of boiling at atmospheric pressure.

The solid reaction product obtained by such reaction may be mechanically separated from the residual aqueous solution and from any soluble reaction products as by filtration and water-washing, and may be dried in any suitable manner, ready for use. The material after drying is ordinarily in finely divided condition, and suitable for direct use as a bleaching or filtration agent. If desired, however, it may be ground to any finer state of division such as may be required for any particular use.

A bleaching material prepared according to the present invention is found to contain a material proportion of chemically combined water, and very probably has the composition represented by the formula $xMgO.ySiO_2.nH_2O$, the proportion of combined water and relative proportions of MgO and $SiO_2$ being subject to considerable variation, as shown in the analyses given below.

The following equation may be considered as typical of the reaction which forms the basis of the process of this invention:

$$xCa(OH)_2 + ySiO_2 + xMgCl_2 + n'H_2O = xMgO.ySiO_2.nH_2O + xCaCl_2 + n''H_2O$$

It will be understood that the above equation represents an ideal case, in which equi-molecular proportions of calcium hydroxide and magnesium chloride enter into the reaction, and that other reactions may also occur.

Various proportions of silica and calcium compound have been employed in the hydrothermal reaction, as well as various proportions of soluble magnesium salt. It is probable that the magnesium silicate formed is a complex silicate, containing for example both mono-silicate and di-silicate. In some cases the finished product contains some combined lime, which may be present as a mono-silicate or a di-silicate. Regardless of the particular chemical composition of the material, it appears to have important properties with respect to color removal or bleaching treatments of oils, fats and waxes, as well as treatment of aqueous materials such as sugar solutions, the material being quite different from acid-treated or acid-activated clays in the matter of sliming in water suspension. In view of its non-sliming characteristics in water, the material may be used in the treatment of hydrocarbon oils which contain water, without clogging filtration surfaces as is often experienced in the use of acid-activated clays. The material has a very high filtration rate in both water and oil use, being in general higher than that of commercial diatomaceous earth.

As specific examples of the preparation of a bleaching material according to the present process, five mixtures were prepared as given in the following table:

| Examples | Reaction mixture in parts by weight | | | | |
|---|---|---|---|---|---|
| | Dolomite | Ca(OH)₂ | SiO₂ | MgCl₂ | Water |
| A | None. | 20 | 30 | 40 | 250 |
| B | None. | 22.5 | 27.5 | 45 | 250 |
| C | None. | 25 | 25 | 50 | 250 |
| D | None. | 30 | 20 | 60 | 250 |
| E | 125 | None. | 98 | 70 | 1400 |

These mixtures were reacted at superatmospheric pressures, examples A, B, C and D being heated with active agitation for two hours at an average temperature of 440° F., and example E being heated without active agitation for three hours at an average temperature of 500° F. The reaction products were then filtered, washed, and dried at a temperature below 250° F. All of these materials were found to have high decolorizing properties and high filtration efficiencies with respect to both oils and aqueous liquids. The compositions of these examples, as determined by chemical analysis, were as follows:

| | Analysis in per cent | | | | |
|---|---|---|---|---|---|
| | A | B | C | D | E |
| Ignition loss at 600° C | 6.84 | 7.86 | 8.16 | 12.76 | 13.36 |
| Free alkalinity as CaO | 0.17 | 0.03 | Trace. | Trace. | Trace. |
| Combined CaO | 6.93 | 6.81 | 8.30 | 9.98 | 11.40 |
| Combined MgO | 20.90 | 24.16 | 25.52 | 31.52 | 20.60 |
| SiO₂ | 59.30 | 54.60 | 49.40 | 40.14 | 46.52 |
| R₂O₃** | 4.08 | 4.60 | 6.06 | 3.70 | (*) |
| CO₂ | (*) | (*) | (*) | (*) | 0.53 |
| Cl₃ | Trace. | Trace. | Trace. | Trace. | Trace. |
| Undetermined | 1.78 | 1.94 | 2.56 | 1.90 | 7.59 |
| | 100.00 | 100.00 | 100.00 | 100.00 | 100.00 |

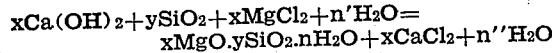
(*=undetermined; **R₂O₃=principally iron and aluminum oxides.)

The above examples of materials were found to be essentially comparable with one another, the higher bleaches being obtained with those having the highest combined water and highest combined MgO. Thus, while Examples A to D had higher combined MgO contents than Example E, the combined water content of E was sufficient to make its bleaching efficiency fall intermediate Examples A to D, rather than below Example A.

The high bleaching efficiency of Example E is of particular interest in view of the fact that while it has been hitherto suggested that $MgCO_3$ be reacted hydrothermally with $SiO_2$ in the formation of a hydrated magnesium silicate, it has also been found that a material such as dolomite, or in fact any magnesite which contains an appreciable CaO content, is not productive of an efficient bleach by such reaction. The reaction is productive of gaseous $CO_2$, resulting from the decomposition of the magnesite, and previous observations of the aqueous reaction of dolomite and $SiO_2$ under heat and pressure showed definitely that only about one-half of the contained $CO_2$ was evolved from the dolomite. In the instant case, as shown by the above analysis, substantially all the $CO_2$ was evolved from the dolomite, leaving less than one percent remaining in the finished material. The presence of the salt of magnesium serves to displace the calcium from the carbonate radical, for combination with the anion of such magnesium salt.

In Examples A through D above, slight excess of magnesium salt over lime was employed, and this excess may be carried to greater limits if desired, it being appreciated that the excess may be recovered from the filtrate in the water washing step following the reaction. Where magnesium sulphate is employed as the soluble magnesium salt, the excess thereof may be directly recovered, while where magnesium chloride is employed it is necessary to separate the excess portion thereof from the soluble calcium chloride produced in the reaction.

I claim:

1. The method of preparing a bleaching material which comprises subjecting a finely divided solid material containing a large proportion of a calcium compound selected from the group consisting of calcium carbonate and calcium hydroxide, to hydrothermal reaction with finely divided silica and a water-soluble magnesium salt of a strong acid, to cause the major portion of said calcium compound to react with said silica and said magnesium salt to form hydrated magnesium silicate and a calcium salt of said strong acid, and to produce a solid bleaching material consisting largely of the hydrated magnesium silicate thus formed.

2. The method set forth in claim 1, said soluble salt comprising magnesium chloride.

3. The method of preparing a bleaching material which comprises subjecting finely divided lime to hydrothermal reaction with finely divided silica and a water-soluble magnesium salt of a strong acid, to cause the major portion of said lime to react with said silica and said magnesium salt to form hydrated magnesium silicate and a calcium salt of said strong acid, and to produce a solid bleaching material consisting largely of the hydrated magnesium silicate thus formed.

4. The method set forth in claim 3, said soluble salt comprising magnesium chloride.

5. The method of preparing a bleaching material which comprises subjecting finely divided calcined dolomite to hydrothermal reaction with finely divided silica and a water-soluble magnesium salt of a strong acid, to cause the major portion of said calcined dolomite to react with said silica and said magnesium salt to form hydrated magnesium silicate and a calcium salt of said strong acid, and to produce a solid bleaching material consisting largely of the hydrated magnesium silicate thus formed.

6. The method set forth in claim 5, said soluble salt comprising magnesium chloride.

7. The method of preparing a bleaching material which comprises subjecting finely divided dolomite to hydrothermal reaction with finely divided silica and a water-soluble magnesium salt of a strong acid, to cause the major portion of said dolomite to react with said silica and said magnesium salt to effect substantially complete liberation of the carbon dioxide from said dolomite and form hydrated magnesium silicate and a calcium salt of said strong acid, and to produce a solid bleaching material consisting largely of the hydrated magnesium silicate thus formed.

8. The method set forth in claim 7, said soluble salt comprising magnesium chloride.

LYLE CALDWELL.